US005912811A

United States Patent [19]
Mackta

[11] Patent Number: 5,912,811

[45] Date of Patent: Jun. 15, 1999

[54] DEVICE FOR REDUCING LOW FREQUENCY ELECTROMAGNETIC FIELDS IN AN ELECTRIC BLANKET AND METHOD

[76] Inventor: Leo Mackta, 6601 Brigadoon Dr., Bethesda, Md. 20817

[21] Appl. No.: 08/951,677

[22] Filed: Oct. 16, 1997

[51] Int. Cl.[6] .............................. H02M 1/12; H05B 1/00; H05B 3/34

[52] U.S. Cl. ............................ 363/45; 219/212; 219/528

[58] Field of Search ................................ 363/45, 46, 47; 219/212, 528

[56] References Cited

U.S. PATENT DOCUMENTS

| | | | |
|---|---|---|---|
| 4,433,368 | 2/1984 | Choi | 363/45 |
| 4,931,625 | 6/1990 | Marlinski | 219/528 |
| 4,998,006 | 3/1991 | Perlman | 219/212 |
| 5,036,177 | 7/1991 | Pagliarini, Jr. | 219/212 |
| 5,081,341 | 1/1992 | Rowe | 219/505 |
| 5,170,043 | 12/1992 | Gunnufson | 219/528 |
| 5,218,185 | 6/1993 | Gross | 219/528 |
| 5,410,127 | 4/1995 | LaRue et al. | 219/212 |

OTHER PUBLICATIONS

Watching The Waves, *The New York Post*, Feb. 27, 1992, Berger, Dr. Stuart, p. 29.

A Case–Control Study of Spontaneous Abortion And Electric Blanket Usage During Pregnancy, *Poster Session A*, p. 75.

Spatially Mapped Magnetic and electric Fields From Electric Blankets, *Poster Session A*, p. 75.

*Primary Examiner*—Peter S. Wong
*Assistant Examiner*—Rajnikant B. Patel
*Attorney, Agent, or Firm*—Hunton & Williams; Thomas J. Scott, Jr.; Tyler S. Brown

[57] ABSTRACT

A device and method for reducing low frequency electromagnetic fields in an electric blanket includes an input, a rectifier filter, and a pair of closely spaced resistance wires. The input is connected to a 60 Hz AC power source to supply power to the electric blanket. The rectifier filter rectifies the input signal and filters out any high order components. The rectifier filter provides a filtered DC signal to apply across the paired resistance wires. In one embodiment, the device and method includes an output for connecting to a conventional electric blanket where the rectifier filter provides a filtered DC signal to the output.

6 Claims, 3 Drawing Sheets

DEVICE FOR REDUCING LOW FREQUENCY ELECTROMAGNETIC FIELDS IN AN ELECTRIC BLANKET AND METHOD

FIELD OF THE INVENTION

The invention relates to a device for reducing low frequency electromagnetic field emissions and method. Specifically, the invention relates to a device and method for reducing the electromagnetic field emissions produced by an electric blanket using a 60 Hz AC power source.

BACKGROUND OF THE INVENTION

Everyday household items such as televisions, clock radios, microwaves, and electric blankets emit electromagnetic fields (EMFs). Research on the effects of these fields on humans has shown they may constitute a potential health hazard. Studies have been conducted about the effects on humans of exposure to low frequency EMFs. Particular emphasis was placed on the EMFs produced by devices using a typical household 60 Hz AC power source. Some of the studies suggest a potential health risk caused by exposure to these EMFs.

The common consensus on how to lower your health risk is to lower your exposure to these fields. For example, do not sit close to the television set. Do not stand in front of the microwave watching it operate. Do not place the clock radio right next to the bed.

The electric blanket and waterbed heater cause some of the more significant exposure problems because of the closeness to the body and extended time of use. Trying to distance yourself from EMFs produced by the blanket is impractical. The further away you get, the less effective the blanket becomes in providing heat. One device was developed to address the problem of exposure. U.S. Pat. No. 5,036,117 to John Pagliarini, Jr. (Pagliarini) discloses a power form converter to transform alternating current to direct current for use in an electric blanket or mattress pad. The Pagliarini device uses an expensive full wave bridge rectifier to double the frequency and rectify the current. Pagliarini states that any electric or magnetic field created in an electric blanket by his direct current power source creates no health hazard. No suggestion is made by Pagliarini, or recognized as necessary, of canceling the EMFs produced by the direct current. While Pagliarini addresses the issue of EMFs, it uses an expensive full wave rectifier and does not address the problem of the direct current EMFs produced.

SUMMARY OF THE INVENTION

The present invention provides a device and method for reducing an electric blanket user's exposure to potentially hazardous low frequency electromagnetic fields (EMFs) resulting from an alternating-current (AC) power source. The present invention includes a conventional 120 volt AC power plug for connection to a household outlet. The AC input is transmitted to a AC-DC rectifier filter to generate a filtered DC output for use in the electric blanket. The electric blanket uses a paired wiring scheme for the heating wires within the blanket.

In operation, the AC power signal is rectified to a DC power signal and filtered to remove any high-order frequency components. The filtered DC signal is sent to the electric blanket. The electric blanket contains paired heating wires. The paired wires are configured to reduce the electric flux and the magnetic field components generated in the surrounding air.

The present invention also includes a separate rectifier filter for use with a conventional electric blanket. The conventional blanket is plugged into the rectifier filter which in turn is plugged into a household outlet. In operation, the rectifier filter converts the household AC to DC for use by the blanket.

Other objects and features of the invention will become apparent as the description proceeds, especially when taken in conjunction with the accompanying drawings illustrating the invention, of which there are three sheets and two embodiments.

DETAILED DESCRIPTION OF THE PREFERRED EMBODIMENTS

Figure 1:
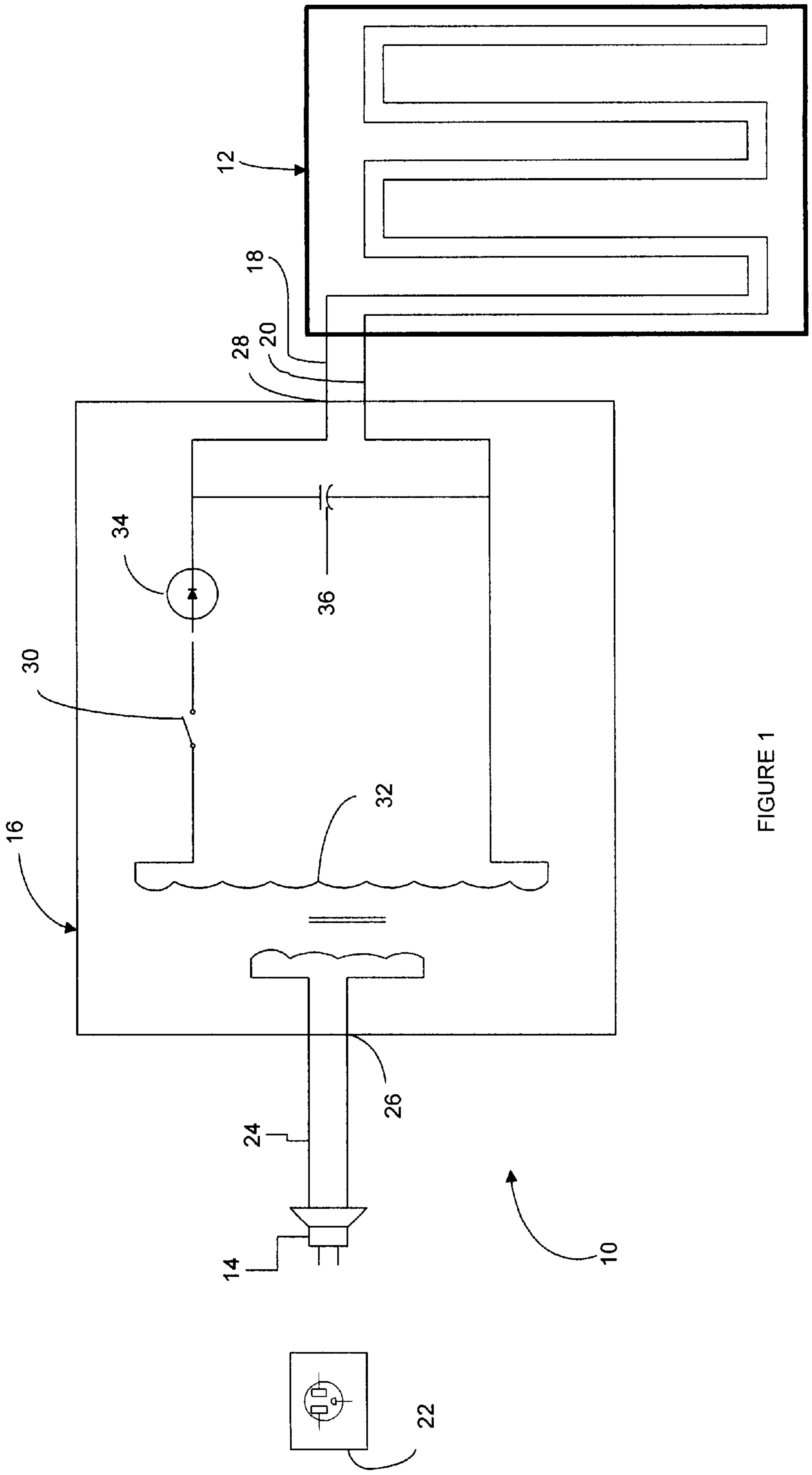
FIG. 1 is a block diagram of an electric blanket with paired wires and an AC-DC rectifier filter according to one embodiment of the invention.

As shown in FIG. 1, a device 10 for reducing the EMFs produced in an electric blanket 12 includes a plug 14, a rectifier filter 16, and a pair of closely spaced resistance wires 18 and 20. The plug 14 is connected to the wires 18 and 20 through the rectifier filter 16.

Plug 14 is adapted to securely connect to a household outlet 22. The outlet 22 provides 120 volt AC power at 60 Hz to the plug 14. A cord 24 extends from the plug 14 to the rectifier filter 16. The cord 24 provides a path to transfer the power from the outlet 22 to the rectifier filter 16.

The rectifier filter 16 includes an input 26, an output 28, and a power switch 30. The input 26 is connected to the cord 24 and delivers 120 volt AC power to the rectifier filter 16. The output 28 is connected to the wires 18 and 20 and delivers DC power to the electric blanket 12. The operation of the device 10 is controlled by the power switch 30 which turns the power on and off.

The rectifier filter 16 also includes a transformer 32 coupled to the input 26, a diode 34 connected between the transformer 32 and the output 28, and a capacitor 36 coupled across the output 28. The transformer 32 inputs the AC power from the input 26 and transforms the input to an isolated 12 volt signal 33. The 12 volt signal is applied across the diode 34 and the capacitor 36. The diode 34 rectifies the 12 volt signal providing a 12 volt half sinusoidal DC signal 35. The capacitor 36 filters the sinusoidal input and provides a relatively constant signal 37. Together, the diode 34 and the capacitor 36 provide a relatively constant VDC output to the output 28. The output 28 applies the signal 37 across wires 18 and 20.

Transformation of input 26 isolates the 12 volt signal from the 120VAC input. The reduction from 120V to 12V allows the electric blanket to use more current at the same wattage then would be allowed with 120V and provides a measure of protection for the user.

The rectifying of the signal reduces the electromagnetic fields produced by lowering the rate of current change.

Figure 4:
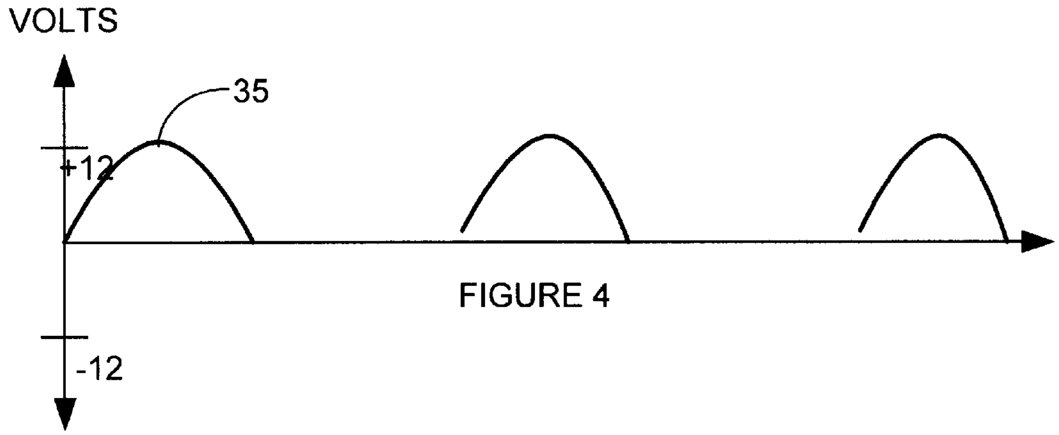
FIG. 4 is a graph of a 12 volt half sinusoidal output of a diode according to the invention.

Magnetic fields are produced by passing a time varying current through a conductor (in this case wires 18 and 20). The strength of the magnetic field is dependent on the rate and magnitude of change of the current and distance from the conductor. Rectification of the AC signal by diode 34 causes the rate and magnitude of change of the current to be reduced by half. The sinusoidal signal is only passed through the diode 34 during periods of positive voltage. Therefore, the diode 34 only passes the signal half of the time and only the positive portions of the signal. See FIG. 4. Use of only half of the sinusoidal AC input prevents the output from doubling in frequency and increasing the rate of change.

Figure 5:
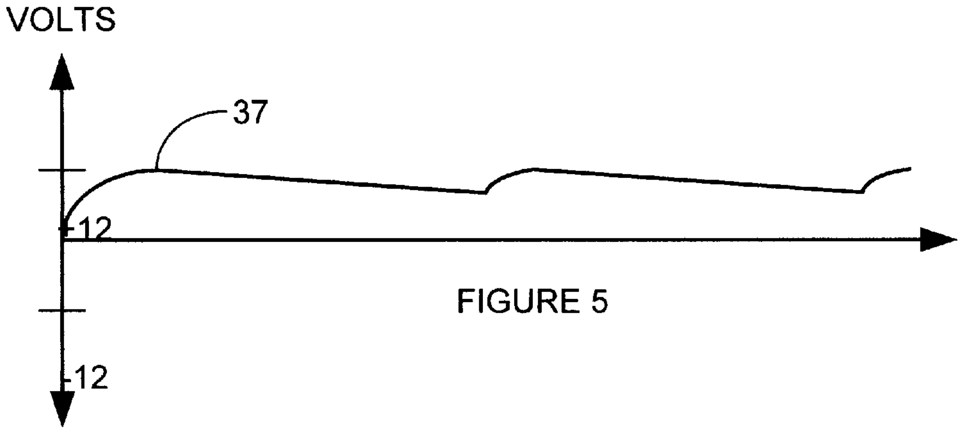
FIG. 5 is a graph of a relatively constant 12 VDC output of a AC-DC rectifier filter according to the invention.

The capacitor 36, in conjunction with the resistance load of wires 18 and 20, decreases the magnitude of change in the output and provides a steady state DC output. As the diode 34 allows the positive portion of the 12V signal to pass, the capacitor 36 charges. When the 12V signal 33 reaches the positive peak of the sinusoidal waveform, capacitor 36 will be at its maximum charge. The capacitor 36 discharges as the signal 33 passing through the diode 34 decreases from the maximum. The discharge of the capacitor 36 keeps the signal 37 close to its peak magnitude while the sinusoidal signal decreases. When the signal increases again pass the level at which the capacitor 36 is currently discharging, the capacitor 36 stops discharging and recharges. See FIG. 5. The capacitor 36 decreases the magnitude of any change in the current and filters out the frequency components of the resulting output 28. The combined effect of rectifying and filtering the input 26 decreases any EMFs produced by the output 28 as it passes through wires 18 and 20.

Resistance wires 18 and 20 connect to output 28 and extend throughout the electric blanket 12. The wires 18 and 20 extended in the blanket 12 in closely spaced relationship. The closely spaced relationship reduces the EMFs generated in the region surrounding the wires 18 and 20. The reduction comes in part by inducing the fields in the closely spaced conductors as opposed to the surrounding region and in part by fields of one wire canceling the fields produced by the other wire. The electromagnetic fields produced by a conductor, especially the electric flux component, will be directed from a conductor of higher potential to a conductor of lower potential if sufficiently close. The electric field generated becomes isolated between the two closely spaced conductors instead of permeating the region surrounding the conductors. The magnetic component produced by two closely spaced conductors is also reduced by canceling. The magnetic field produced by one conductor will encounter and generally cancel out the magnetic field produced by a closely spaced conductor if the respective currents are flowing in the opposite direction. Since the current flows away from output 28 along wire 18 and returns along wire 20, closely spaced wires 18 and 20 tend to cancel any magnetic fields produced.

The device 10 operates by using 120 volt, 60 Hz AC power generally available in all households. The plug 14 is inserted in the outlet 22 to connect the device 10 to the AC power source. When the switch 30 is on, 120 VAC power is drawn from the outlet 22 at 60 Hz and transmitted along the cord 24 to the input 26. The input 26 is coupled to the high side of the transformer 32. The 120 VAC power is transformed by the transformer 32 to the 12 volt signal 33 and isolated from the 120 VAC power. The 12V signal 33 is rectified by the diode 34 to generate a 12V DC signal 35. The 12V DC signal 35 is filtered by capacitor 36 resulting in the relatively constant 12V DC signal 37 coupled to the output 28. The 12V DC signal 37 is the output 28 from the rectifier filter 16 applied across the wires 18 and 20.

The current from the output 28 flows along the wire 18 through the blanket 12. As current flows through the wire 18, heat is generated through resistance of the wire to the current flow. The current returns to the output 28 through the wire 20. Heat is also generated by passage of the current along the wire 20.

Figure 2:
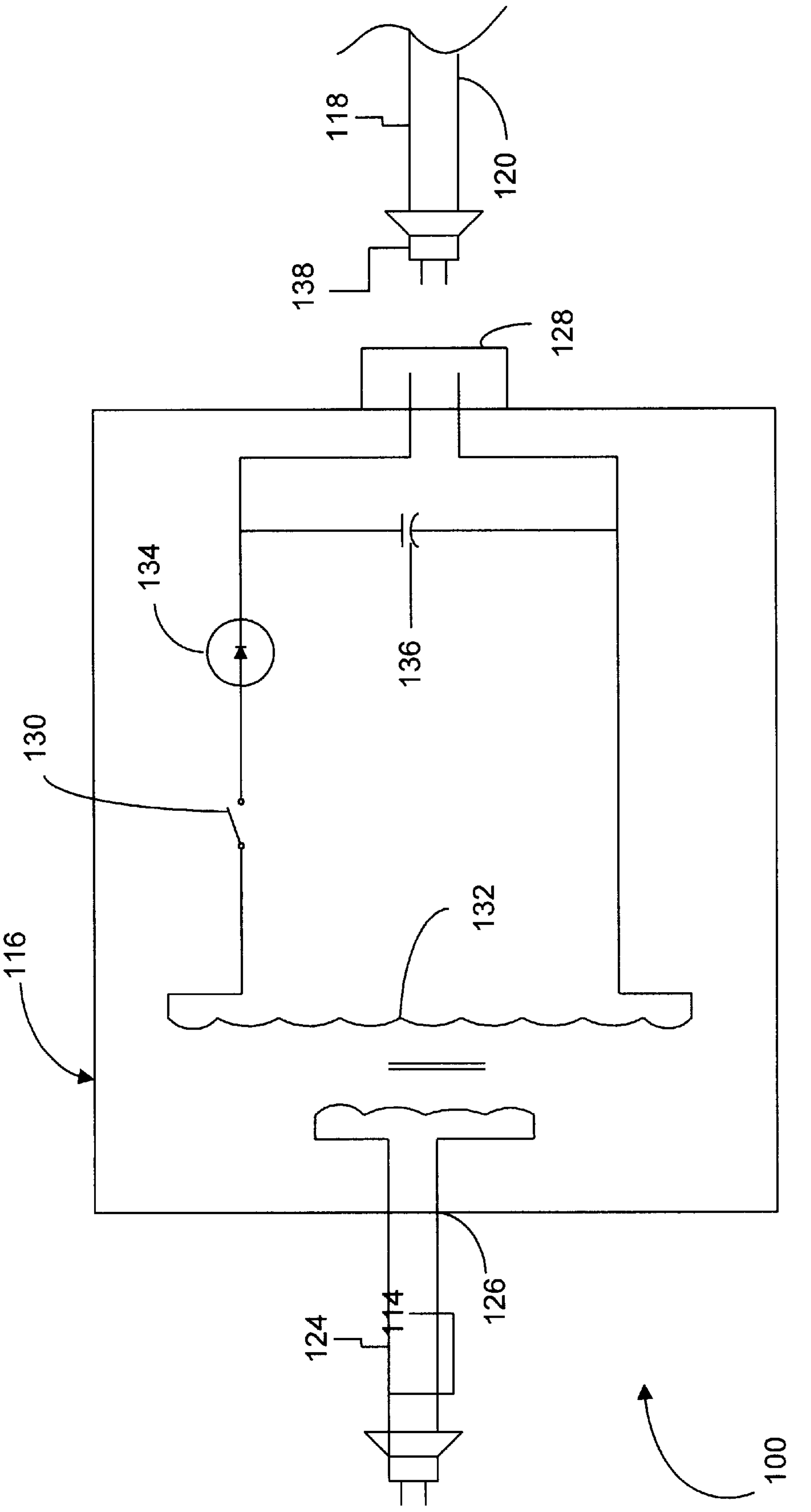
FIG. 2 is a block diagram of an AC-DC rectifier filter for conventional blankets according to one embodiment of the invention.
Figure 3:
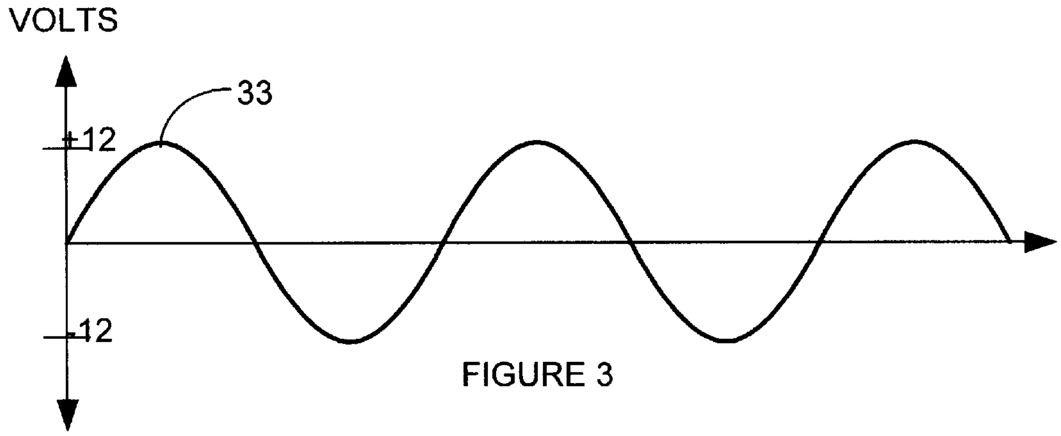
FIG. 3 is a graph of a 12 volt sinusoidal output of a transformer according to the invention.

In a second embodiment, as shown in FIG. 2, a device 100 for reducing low frequency electromagnetic fields in an electromagnetic blanket (not shown) includes a plug 114, a rectifier filter 116, and an outlet 128.

The plug 114 is similar to plug 14 and is adapted for plugging in a standard household outlet (not shown). The plug 114 includes a cord 124 extending from the plug 114 to the rectifier filter 116.

The rectifier filter 116 is similar to the rectifier filter 16 and includes similar components such as input 126, a power switch 130, a transformer 132, a diode 134, and a capacitor 136. The rectifier filter 116 works similar to the previously described rectifier filter 16. The rectifier filter takes 120 VAC power at input 126 and generates a relatively constant 120V DC signal at outlet 128.

The outlet 128 is similar to the standard outlet found in households and is adapted to securely connect a plug 138 to the rectifier filter 116. The plug 138 is connected to an electric blanket (not shown) through wires 118 and 120. The outlet 128 allows the plug 138 to be connected to the rectifier filter 116 instead of a household outlet. This allows a conventional electric blanket to receive the benefit of applying filtered DC power to the blanket thereby reducing potentially harmful electromagnetic fields.

The device 100 does not include the added benefit of a closely spaced wire in the blanket since the original blanket is used. Also, transformer 132 only isolates the 120 VAC signal and does not reduce the voltage to 12 volts. The limitation is necessary because a conventional blanket is designed to receive a 120 V signal through the plug 138 along the wires 118 and 120.

While I have illustrated and described two preferred embodiments of my invention, it is understood that this is capable of modification, and I therefore do not wish to be limited to the precise details set forth, but desire to avail myself of such changes and alterations as fall within the purview of the following claims.

What I claim as my invention is:

1. A device for reducing low frequency electromagnetic field emissions of an electric blanket, the device comprising:

a rectifier filter;

an input connected to said rectifier filter;

said rectifier filter including an AC to DC rectifier, a low pass filter and an isolation transformer; wherein said rectifier filter rectifies said input at a frequency, said frequency being the same before rectification and after rectification;

said isolation transformer having a secondary voltage an order of magnitude lower than a primary voltage and a secondary current an order of magnitude higher than a primary current;

an output connected to said rectifier filter; said input coupled to said output through said rectifier filter;

a first wire extending through the electric blanket and connecting to said output; and a second wire extending through the electric blanket and connecting to said output, said first wire closely spaced from said second wire said first wire and said second wire lying in a plane, said plane extending through said electrode blanket.

2. The device as claimed in claim 1 wherein said output is adapted to securely engage a power plug of an electric blanket and said input is adapted to engage a household outlet.

3. The device as claimed in claim 1 wherein said rectifier is a diode and said filter is a capacitor.

4. The device as claimed in claim 1 wherein said first wire and said second wire produce mutually canceling electromagnetic fields.

5. A method for reducing low frequency electromagnetic fields emitted by an electric blanket having a rectifier filter connected to the blanket, said rectifier filter including an AC to DC rectifier, a low pass filter and a 10 to 1 isolation transformer; wherein said rectifier filter rectifies said input at a frequency, said frequency being the same before rectification and after rectification; and a pair of closely spaced wires extending through the blanket in a plane; the method comprising the steps of A) connecting the rectifier filter to a power source input;

B) drawing an input from the power source input;

C) rectifying and filtering the input to create an output;

D) creating an output; and

E) applying the output to the electric blanket.

6. The device as claimed in claim 1 wherein said isolation transformer is a 10 to 1 isolation transformer.

* * * * *